Figure 6:
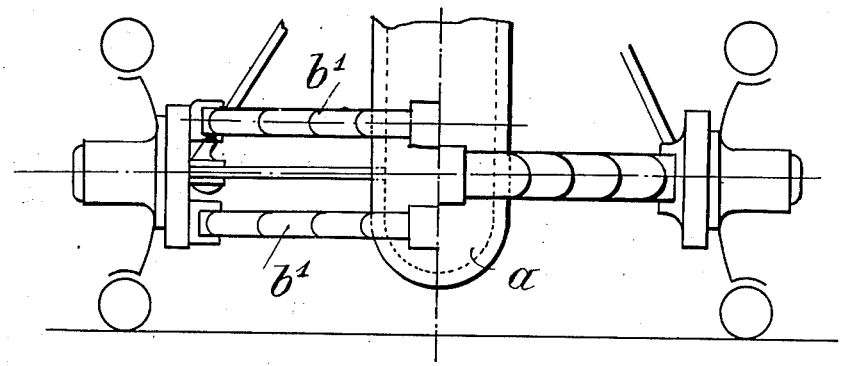

Feb. 17. 1925.  
L. KRIEGER  
AUTOMOBILE VEHICLE  
Filed July 1, 1920  
1,526,481  
5 Sheets-Sheet 1
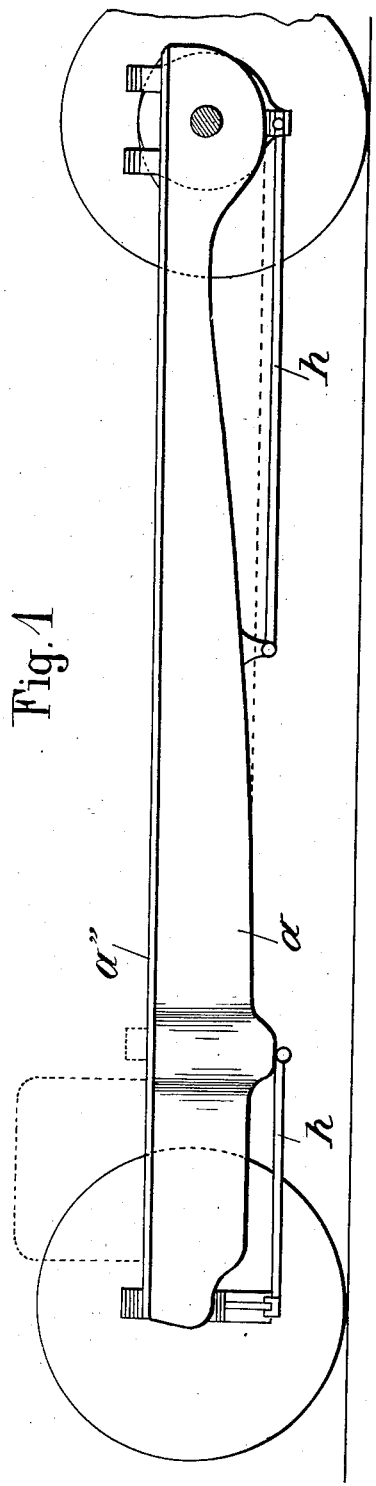
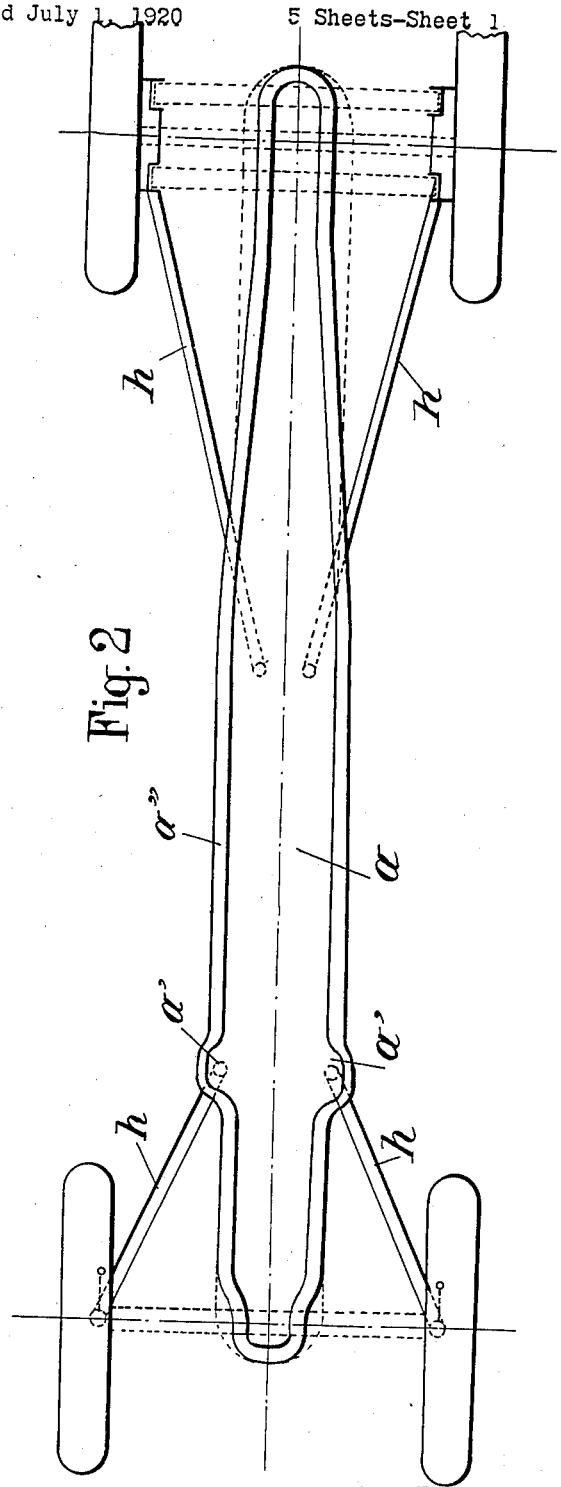
INVENTOR  
Louis Krieger  
BY Townsend & Decker  
ATTORNEYS

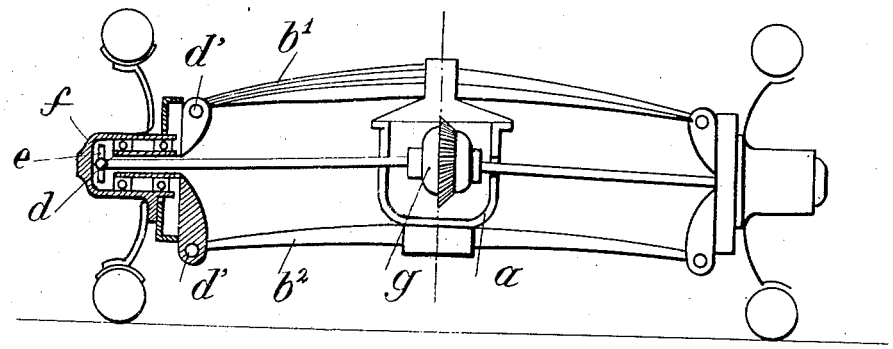
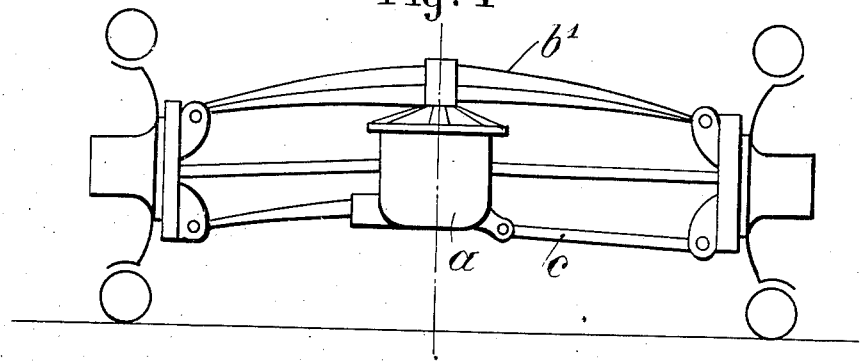
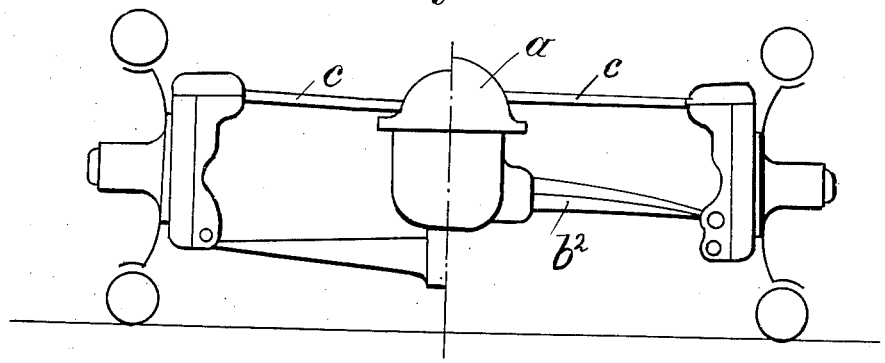

Feb. 17. 1925.　　　　　L. KRIEGER　　　　　1,526,481
AUTOMOBILE VEHICLE
Filed July 1, 1920　　5 Sheets-Sheet 5

INVENTOR
Louis Krieger
BY Townsend & Decker
ATTORNEYS.

Patented Feb. 17, 1925.

1,526,481

UNITED STATES PATENT OFFICE.

LOUIS KRIEGER, OF PARIS, FRANCE.

AUTOMOBILE VEHICLE.

Application filed July 1, 1920. Serial No. 393,410.

*To all whom it may concern:*

Be it known that I, LOUIS KRIEGER, of 3 Rue Ampère, Paris, France, engineer, have invented new and useful Improvements in Automobile Vehicles, which improvements are fully set forth in the following specification.

This invention has for its object a new arrangement of chassis and means for suspending automobile vehicles.

According to this invention an automobile vehicle comprises a metal beam placed axially to the vehicle and suspension arrangements which allow said beam (forming the chassis) to be supported elastically upon the wheels without the intermediary of axles.

The beam in question may be hollow in the form of a gutter for example, and provided with suitable partitions and closed in such a manner that it may serve as a casing and support to all the mechanical parts of the vehicle which hitherto were enclosed in separate casings and supported by frame plates.

In particular if the vehicle were provided with an electric motor and a battery of accumulators the battery may be placed either within the axial beam itself or on both sides of it so that it may be easily removable.

The suspension arrangements for the steering and the transmission gear may be formed of one or more springs either superposed or arranged in the same horizontal plane; such springs being in sections or otherwise and connected to the beam in any suitable manner and to journals or supports for the wheel journals. One or more springs may be replaced by connecting rods jointed in a vertical plane or by a jointed shaft of unvarying length for the driving control. In all cases the jointed shafts may be provided with a strong metal casing of unvarying length and jointed spherically at both ends both to the journal and to the axial beam. The driving Cardan shaft may in this case if necessary be extensible.

The parts may be so arranged that during an upward movement in which the carriage and the axial beam take an inclination, the wheels incline in opposite directions in such a manner that their point of contact with the ground will be thrown towards the outer portion of the curve; this is effected either by arranging between the axial beam and the wheel journal one or more horizontal layers of one or more springs jointed to the journal made fast to the beam and having an outwardly turned concave portion or an inclined layer of one or more convex springs and one or more jointed connecting rods crossing each other; or this may be effected without jointing the springs to the journals, the springs being confined to a single layer of one or more springs in one or two tiers preferably placed below the wheel axis or again in the position of and in place of the old wheel axles, the transverse jointed shafts being then extensible.

Figure 7:
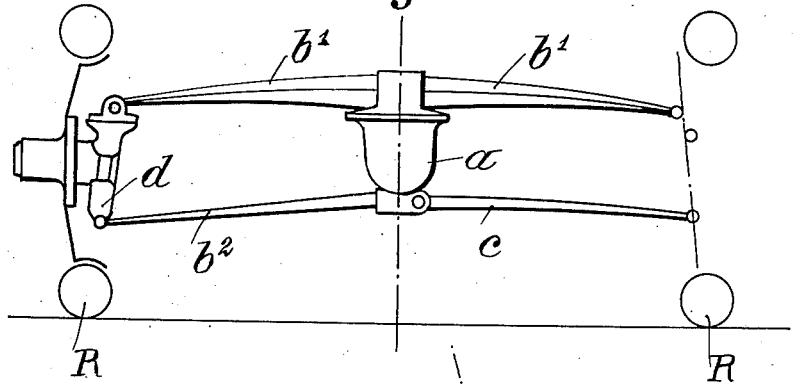
Figure 10:
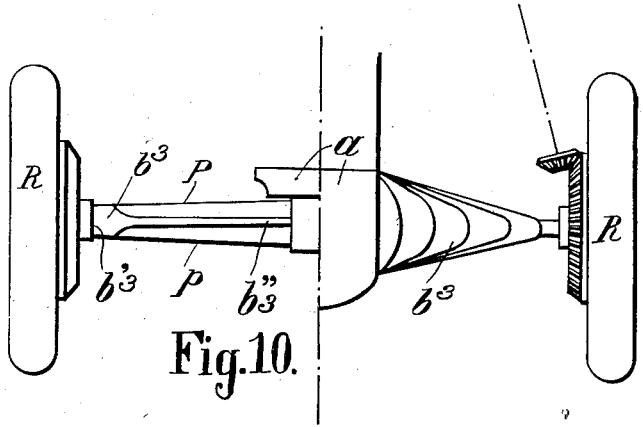
Figure 8:
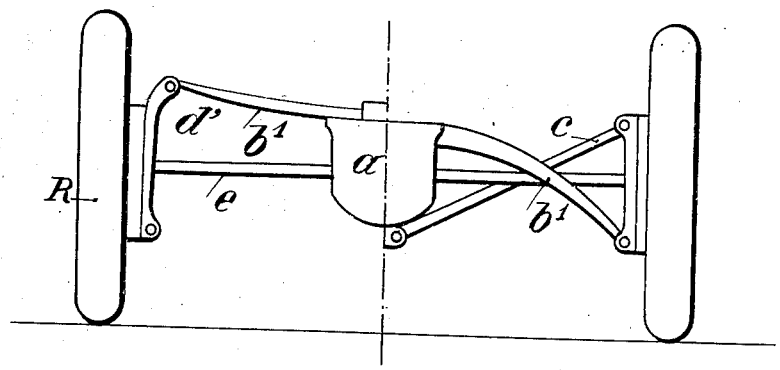
Figure 9:
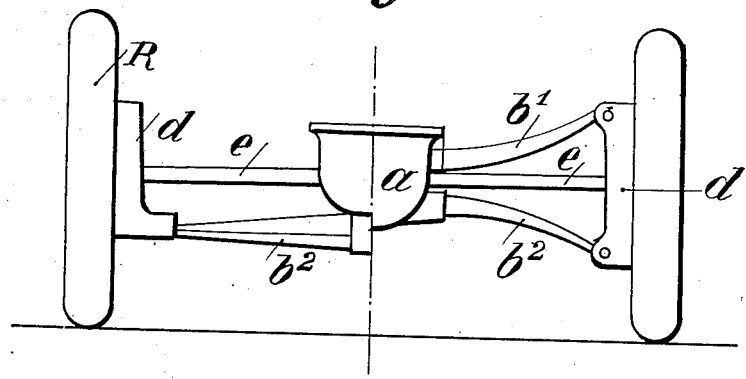
Figure 11:
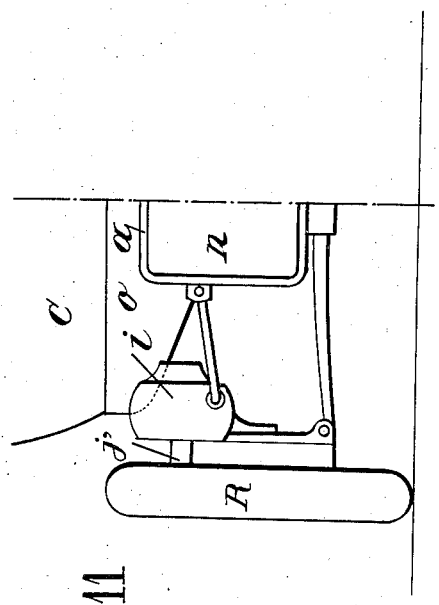

The invention is illustrated in the accompanying drawings in which Figures 1 and 2 are respectively a side elevation and a plan of an axial beam; Figure 3 is a transverse section and partial elevation of the rear transmission gear; Figures 4 and 5 are transverse elevations of the rear transmission showing in the half portions to the right and left of the axle a different method of carrying out the invention. In Figure 5 the invention is shown applied to transmission gear having a demultiplying arrangement at the rear wheels. Figure 6 is a similar view in plan of the rear transmission gear; Figure 7 is a similar view in transverse elevation of the front transmission gear; Figures 8 and 9 are end views and Figure 10 is a half elevation and half plan of different modifications in the case of the non-parallelism of the wheels with the vertical plane of the chassis during upward movement. Figure 11 is a half end elevation, Figure 12 a side elevation and Figure 13 a corresponding half end elevation of two methods of arranging a battery of accumulators upon the vehicle.

In these figures $a$ is the axial beam which may be in plan of a width equal to about one fifth of the track of the vehicle and of a height sufficient rigidly to support the load placed upon the vehicle.

This metal beam (which may be raised, soldered or cast or be made of any suitable metal) is in Figure 3 of a U or gutter shape so as to allow it to enclose the mechanism of the vehicle. It comprises for this purpose enlargements such as $a^1$ (Figure 2) or such narrowings as may be judged necessary. Its vertical profile (Figure 1) should be straight or preferably of a shape as to give equal resistance or it may be of any other suitable shape.

The front of the beam $a$ may, for example, serve as a casing to the engine crank; its centre may enclose the change speed gear and its rear the drive gears of the wheels and the differential.

When a battery of accumulators $n$ is employed this may as shown in Figure 11 be enclosed within the axial beam, the wheels R being then supposed to be driven each by an electric motor $i$ rigidly fixed to the wheels which they drive through the intermediary of a demultiplying train $j$, cross pieces $o$ resting upon the beam $a$ support the body work C. The battery in this case occupies the whole or portion of the length of the beam which is free from all inside mechanism; the battery may easily be placed therein or be removed therefrom at one or both of the ends by a mere push movement in one direction or the other. The battery may form a single entity or it may be divided into parts.

Figure 13:
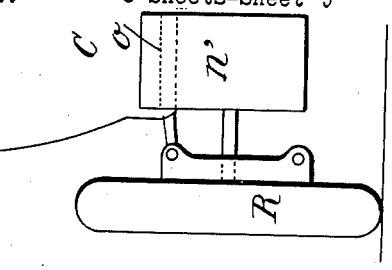
Figure 12:
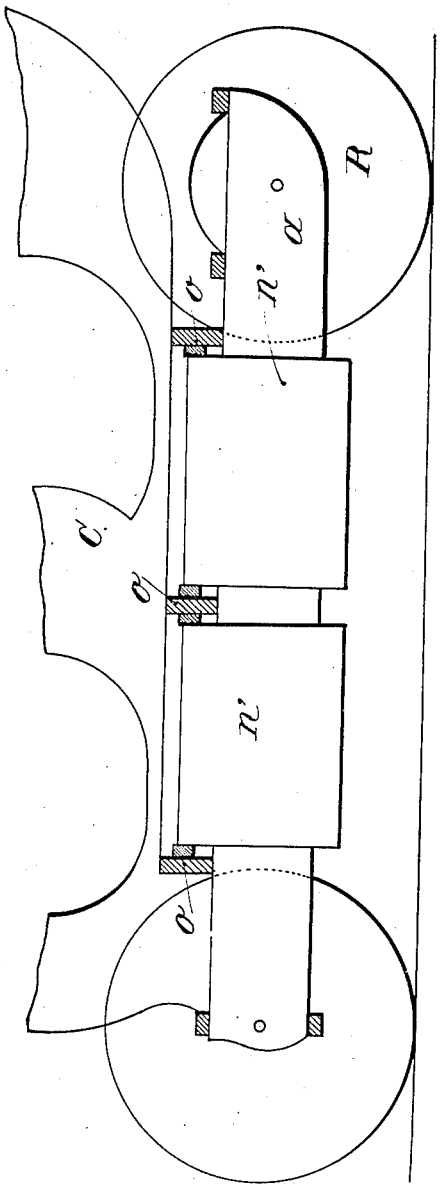

The battery of accumulators may as shown in Figures 12 and 13 easily be subdivided into four parts $n^1$ which rest and are fixed on both sides of the beam $a$ and may be hooked over the cross pieces $o$ which support the body work C. In this case the battery parts are put in position and removed by sliding them on suitable supports (the steps having been removed if necessary) and by lifting or unhooking or vertically hooking the battery parts from or upon their supports.

All the steering parts, clutch parts and braking parts may advantageously be contained within the beam or fixed to its walls. Watertight partitions arranged in any suitable positions and metal covers fixed to the edges $a''$ of the beam allow the mechanisms to be placed in a bath of lubricant while adding to the strength of the assemblage.

Perpendicularly to the beam are arranged suspension springs which may be arranged in different ways.

Thus with front transmission gear (Figure 7) two springs $b^1$, $b^2$, may be employed, arranged one above the other in a vertical plane on both sides of the beam upon which they are made fast at their centre (half elevation on the left of Figure 7) or a single upper spring $b^1$ may be employed and the lower spring $b^2$ replaced by a connecting rod $c$ jointed in a vertical plane (half elevation on the right of Figure 7). The springs are jointed at their ends to pivots or to supports $d$ for the pivot of the wheels R of the vehicle. The connecting rods $c$ are jointed both to the supports for the pivot of the wheels and to the beam $a$.

The springs $b^1$, $b^2$ may be in one or more parts.

With a rear transmission gear (Figures 3–6) two springs $b^1$, $b^2$, arranged one above the other in a vertical plane (Figure 3) may be employed; as with the front train, these springs are jointed to prolongations $d'$ of the rear journals $d$ which are shown hollow for a drive through Cardan joints $e$ but which with demultiplying gear on the wheel itself are made solid. A Cardan joint $e$ is arranged both at the hub $f$ and at the differential $g$ located within the hollow beam $a$.

The two cardans $e$ may be of unvarying length if their inclinations are in relation with the prolongation of the springs, the small difference which may exist being then compensated by the longitudinal play between the journal and the hub.

As with the front transmission gear the lower spring $b^2$ may be replaced for example by jointed connecting rods $c$ (half elevation on the right of Figure 4). As with the front transmission gear also springs $b^1$ $b^2$ in one or more parts may be secured to the beam $a$. At the upper portion as at the lower portion the two springs shown in the half plan on the left of Figure 6 may be arranged in the same horizontal plane, in place of one spring (half plan on the right of Figure 6) and they are separated at a sufficient distance apart to give greater security to the fixture of the wheel in its plane.

The lower springs, or also the upper springs may be eliminated as in Figure 5, and by the aid of a single set of springs $b^2$ arranged in the horizontal plane and jointed half shafts $c$ of unvarying length the inclinations of the wheels may be supported in all directions: this is the most economical solution.

When demultiplying members are present (as in Figure 5) upon the wheels the jointed half shafts which they drive should of course be placed on the diameter opposite to that fixing the springs. This arrangement is applicable for the case of driving and steering wheels.

If it is desired during upward movements that the wheels shall incline in the opposite direction to the axial beam, the axial beam $a$ (half elevation on the left of Figure 8) may be connected to the wheel R by the jointed half shaft $e$ and by an outwardly bent spring $b^1$ made fast to the upper portion of the beam and jointed to the extension $d'$ of the wheel journal.

In the half elevation on the right in Figure 8 a convex spring $b^1$ is employed and a jointed connecting rod $c$ crossing it.

In the half elevation on the right of Figure 9 two upper and lower springs $b^1$, $b^2$, of inverse curvature, are employed which are fixed to the beam $a$ and jointed to the wheel journal $d$; each spring $b^1$ $b^2$ has its concave portion turned outwards.

In these three cases the beam inclines about an imaginary perpendicular axis of rotation approximately at the centre of the springs.

The arrangement above described may also be simplified by eliminating the joints at the ends of the springs and by supporting the journal only by a single horizontal layer of one or more springs; but in this case the transverse jointed half shafts and their casing should be extensible.

The half elevation on the left of Figure 9 shows an arrangement of this type. The two ends of the spring $b^2$ are made fast to the beam $a$ and to the journal $d$. The spring is preferably placed below the axle of the wheel in order to avoid during any lateral stresses all bending of the master leaf which is reinforced for this purpose at its attachment to the journal. Springs provided with steps upon their two faces may be employed, the master leaf being if desired cut at the axis of the beam into two portions maintained together on the beam in a transverse and longitudinal direction but may be jointed vertically. The extensible jointed half shafts may be provided for chain drives or may drive demultiplying gear on the wheel. In the half elevation of Figure 10 the spring $b^3$ arranged as above is located in the position of the old axle of the vehicle. The master leaf preferably cut into two pieces is then shaped at its ends to form at $b'^3$ a journal and beginning from the bearing washer of the wheel decreases rapidly in size until it is of the thickness $b''^3$ provided for the master leaf. One or two (one above and one below) steps $p$ complete the moment of inertia necessary for the assemblage of this spring.

In plan (half plan on Figure 10) the master leaf and the blades are progressively enlarged towards the centre of the spring but they may also have a straight profile.

In all cases the axial beam is made fast to such elastic axles of new type.

All the arrangements are applicable to transmission gear, steering gear or to transmission and steering gear.

In all the arrangements which precede one or more springs may be replaced by connecting rods jointed in a vertical plane, but of course at least one spring per transmission gear must remain.

In all these arrangements also the springs may be provided with blades on both sides in order to act in both directions; in this case the master leaf may be jointed at both ends in the case of the part springs mentioned above.

Two triangles formed of four bars $h$ (Figure 2) suitably jointed both to the journals or pivots of the wheel journals and to the beam $a$ consolidate all the assemblage of the front and rear transmission gears and absorb shocks due to braking.

The employment per transmission gear of several springs in the same horizontal plane may allow the size of the bars to be diminished or even allow the removal of the bars.

It may be noted finally that the axial beam $a$ may stop either to the right of the springs $b^1$, $b^2$, or a little beyond or after them according to the necessities of construction; it may be connected to the springs by any suitable arrangement.

What I claim is:—

In an automobile, the combination with a metal beam placed axially of the vehicle and forming a chassis of transverse suspension means supporting the beam elastically upon the wheels without the intermediary of axles, said transverse suspension means comprising a transverse spring connected at its ends respectively to the beam and to the wheel journal, and a connecting bar attached at its ends respectively to said beam and wheel journal, said bar and spring being disposed in a diagonal or cross-wise relation with respect to one another.

In testimony that I claim the foregoing as my invention I have signed my name this 16th day of June 1920.

LOUIS KRIEGER.